United States Patent
Fan et al.

(10) Patent No.: US 11,352,719 B2
(45) Date of Patent: Jun. 7, 2022

(54) POLYESTER YARN FOR INDUSTRIAL SEWING THREAD AND PREPARING METHOD THEREOF

(71) Applicant: JIANGSU HENGLI CHEMICAL FIBRE CO., LTD., Wujiang (CN)

(72) Inventors: Hongwei Fan, Wujiang (CN); Shanshui Wang, Wujiang (CN); Lili Wang, Wujiang (CN)

(73) Assignee: JIANGSU HENGLI CHEMICAL FIBRE CO., LTD., Wujiang (CN)

( * ) Notice: Subject to any disclaimer, the term of this patent is extended or adjusted under 35 U.S.C. 154(b) by 0 days.

(21) Appl. No.: 17/276,155

(22) PCT Filed: Oct. 29, 2019

(86) PCT No.: PCT/CN2019/113889
§ 371 (c)(1),
(2) Date: Mar. 15, 2021

(87) PCT Pub. No.: WO2020/134499
PCT Pub. Date: Jul. 2, 2020

(65) Prior Publication Data
US 2021/0355609 A1 Nov. 18, 2021

(30) Foreign Application Priority Data

Dec. 27, 2018 (CN) .......................... 201811614107.X

(51) Int. Cl.
| | | |
|---|---|---|
| *C07F 7/08* | (2006.01) |
| *C08G 63/183* | (2006.01) |
| *C08G 63/695* | (2006.01) |
| *C08G 77/445* | (2006.01) |
| *C08L 67/02* | (2006.01) |
| *D01D 5/12* | (2006.01) |
| *D01D 5/16* | (2006.01) |
| *D01D 7/00* | (2006.01) |
| *D01F 1/07* | (2006.01) |
| *D01F 6/62* | (2006.01) |
| *D02G 3/46* | (2006.01) |
| *D02J 1/22* | (2006.01) |
| *D02J 13/00* | (2006.01) |
| *D01F 6/92* | (2006.01) |
| *C08G 63/80* | (2006.01) |
| *C08G 63/86* | (2006.01) |
| *D01D 5/096* | (2006.01) |
| *D01D 5/098* | (2006.01) |
| *D01D 10/02* | (2006.01) |
| *D01F 1/10* | (2006.01) |
| *D02G 3/02* | (2006.01) |
| *D01D 5/088* | (2006.01) |
| *C01G 30/00* | (2006.01) |

(52) U.S. Cl.
CPC ............ *D01F 6/92* (2013.01); *C08G 63/6956* (2013.01); *C08G 63/80* (2013.01); *C08G 63/866* (2013.01); *D01D 5/096* (2013.01); *D01D 5/098* (2013.01); *D01D 10/02* (2013.01); *D01F 1/10* (2013.01); *D02G 3/02* (2013.01); *C01G 30/004* (2013.01); *C01G 30/005* (2013.01); *C07F 7/0803* (2013.01); *C07F 7/0805* (2013.01); *D01D 5/088* (2013.01)

(58) Field of Classification Search
CPC ....... C01G 30/004; C01G 30/005; C07F 7/08; C07F 7/0803; C07F 7/0805; C08G 63/183; C08G 63/695; C08G 63/6956; C08G 63/80; C08G 63/866; C08G 77/445; C08L 67/02; D01D 5/08; D01D 5/088; D01D 5/12; D01D 5/16; D01D 7/00; D01D 10/02; D01F 1/07; D01F 1/10; D01F 6/62; D02G 3/46; D02J 1/22; D02J 13/00
USPC ......... 264/210.3, 210.4, 210.5, 210.6, 210.8, 264/211.12, 211.14, 331.21; 423/87, 617; 428/364; 524/140, 141, 147, 409, 556, 524/710, 878; 525/418, 446; 528/308.1, 528/308.2, 308.3; 556/449, 465
See application file for complete search history.

(56) References Cited

U.S. PATENT DOCUMENTS 3,407,112 A 10/1968 Du Pont
5,552,223 A * 9/1996 Mikami ............... C08G 77/445
525/446 X

FOREIGN PATENT DOCUMENTS

| CN | 108385189 A | 8/2018 |
| CN | 109735937 A | 5/2019 |
| CN | 109735955 A | 5/2019 |

* cited by examiner

Primary Examiner — Leo B Tentoni
(74) Attorney, Agent, or Firm — Bayramoglu Law Offices LLC

(57) ABSTRACT

A type of polyester yarn for an industrial sewing thread and preparing method thereof are provided. The preparing method is composed of a viscosity enhancing by a solid state polycondensation and a melt spinning for a modified polyester, and the modified polyester is a product of esterification and polycondensation of evenly mixed terephthalic acid, ethylene glycol, tert-butyl branched dicarboxylic acid, trimethylsilyl branched diol and a doped $Sb_2O_3$ powder, wherein the tert-butyl branched dicarboxylic acid is selected from the group consisting of 5-tert-butyl-1,3-benzoic acid, 2-tert-butyl-1,6-hexanedioic acid, 3-tert-butyl-1,6-hexanedioic acid and 2,5-di-tert-butyl-1,6-hexanedioic acid. Moreover, the modified polyester is dispersed with a doped $ZrO_2$ powder. An obtained fiber has an intrinsic viscosity drop of 23-28% when stored at 25° C. and R.H. 65% for 60 months.

17 Claims, No Drawings

POLYESTER YARN FOR INDUSTRIAL SEWING THREAD AND PREPARING METHOD THEREOF

CROSS REFERENCE TO THE RELATED APPLICATIONS

This application is the national stage entry of International Application No. PCT/CN2019/113889, filed on Oct. 29, 2019, which is based upon and claims priority to Chinese Patent Application No. 201811614107.X, filed on Dec. 27, 2018, the entire contents of which are incorporated herein by reference.

TECHNICAL FIELD

The present invention belongs to the field of polyester fiber, and more particularly, relates to one type of degradable polyester fiber and preparing method thereof.

BACKGROUND

Polyester fiber industry has developed rapidly in the past. In the early stage of large-scale production of polyester fiber, it was mainly used in clothing and decoration in the form cotton type staple, wool type staple fiber and ordinary filament. With the increase of polyester production and the demand of social development, the application field of polyester fiber has gradually expanded to the industrial textiles.

The chemical composition of polyester industrial yarn is the same as that of common polyester fiber, however, the polyester for industrial yarn has the characteristics of large molecular weight, narrow molecular weight distribution, high breaking strength, large modulus, small elongation, heat resistance, impact resistance and fatigue resistance. Therefore, polyester industrial yarn is suitable for rubber reinforcement and many industrial textiles.

At present, the commonly used catalyst for polyester synthesis is of antimony class. Antimony compounds, such as $Sb_2O_3$, usually need to be used in large dose to catalyze the polyester synthesis that has been considered as a non-environmentally-friendly production mode. Meanwhile, antimony compounds will be converted into simple substance in polycondensation reaction, which makes polyester product gray and dull. However, a small amount of antimony compounds cannot catalyze the reactions of all raw materials involved in polyester synthesis.

In addition, higher and higher requirements for the quality of sewing thread to meet the demands rising in the modern life and technology. Polyester sewing thread is widely used in high-grade clothing, leather products, medical surgery and military products with high strength, wear resistance, corrosion resistance, mildew resistance and endless. The polyester yarn for high-grade sewing thread is required to have a strength higher than 7 cN/dtex and low shrinkage and small elongation.

However, when used as a textile material, polyester fiber still has some defects, mainly difficult dyeing and low moisture absorption. As a matter of fact, polyester fiber is a kind of hydrophobic synthetic fiber, and has no functional groups which can directly combine with acid dyes or basic dyes. Although the ester group on polyester fiber can form hydrogen bond with disperse dyes, it is difficult for dye molecules to enter the fiber due to its compact molecular chain structures. Therefore, polyester can be colored by means of almost only disperse dyes under the condition of high temperature and high pressure or with the help of carrier, resulting in drab style, high energy consumption and low dye uptake.

Therefore, to make a kind of polyester yarn with good dyeing performance and high quality has become an urgent work.

SUMMARY

The primary object of the present invention is to provide one kind of polyester yarn with good dyeing performance and high quality suitable for the industrial sewing thread as well as the preparing method thereof, so as to overcome the inadequacies in the polyester fiber made with the existing technology.

To this end, the key technical points of the invention are as follows.

The preparing method of polyester yarn for the industrial sewing thread herein, is characterized by manufacturing filament from a modified polyester through a series of processes composed of viscosity enhancing by solid state polycondensation, melting, metering, extruding, cooling, oiling, stretching, heat setting and winding;

wherein the modified polyester is the product of esterification and the following polycondensation of evenly mixed terephthalic acid, ethylene glycol, the tert-butyl branched dicarboxylic acid, the trimethylsilyl branched diol and the doped $Sb_2O_3$ powder;

wherein the tert-butyl branched dicarboxylic acid is selected from the group consisting of 5-tert-butyl-1,3-benzoic acid, 2-tert-butyl-1,6-hexanedioic acid, 3-tert-butyl-1,6-hexanedioic acid and 2,5-di-tert-butyl-1,6-hexanedioic acid, and wherein the trimethylsilyl branched diol has a molecular formula as

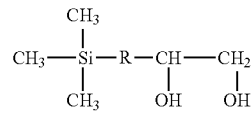

with R stands for —$CH_2$—, —$CH(CH_3)$— or —$C((CH_3)_2)$—.

Herein the polyester is modified by the tert-butyl branched dicarboxylic acid and the trimethylsilyl branched diol, which will change the segment movement mode, the inter-segment force and the inter-segment distance of the polyester main chains so as to enlarge the void free volume. Moreover, disperse dyes are some small molecules without water-soluble groups, and mostly exist in the form of particles with a size ranged from several hundred nanometers to one micron. During the dyeing process of the modified polyester herein, the branched groups will move prior to the main chain, and when the temperature of dyeing bath reaches 120~130° C., the movements of branched groups become more intense than those of main chains, so as to form more void free volumes which are larger in size than the slit free volumes generated by the main chains. Therefore, the penetration of dye particles into the polyester will be enhanced significantly, which can reduce the dyeing temperature, shorten the dyeing time, reduce the energy consumption and improve the dye uptake.

Herein the doped $Sb_2O_3$ is obtained through a process of evenly mixing $M^{x+}$ solution and $Sb^{3+}$ solution at first, then dripping in the precipitant until the pH=9-10, and finally calcining the precipitate; wherein $M^{x+}$ is more than one ion selected from $Mg^{2+}$, $Ca^{2+}$, $Ba^{2+}$ and $Zn_{2+}$.

Herein the doping of the metal oxides with certain catalytic activity and antimony trioxide is realized via the steps including solution blending, coprecipitating and calcining, wherein the metal oxide is more than one of MgO, CaO, BaO and ZnO. As a result, defects will be formed in $Sb_2O_3$ crystals because the doping metal oxide can inhibit the crystallization and crystal growth of $Sb_2O_3$ or entre the $Sb_2O_3$ crystal lattice through isomorphic substitution effect. Hence the specific surface area ($S_g$) of catalyst $Sb_2O_3$ will be enlarged due to the deformed crystal morphology and the reduced crystal size, and the activity per unit surface area ($r_s$) of $Sb_2O_3$ will also be increased because of the enrichment of doping metal in the surface of $Sb_2O_3$. The larger $S_g$ or $r_s$, the higher the catalytic activity, therefore the environmental protection production of polyester and high quality of final fiber could be guaranteed in the present invention through the polymer synthesis catalyzed with low $Sb_2O_3$ addition.

The following preferred technology program, is presented to give a detailed description for this invention.

In the preparing method of the polyester yarn for industrial sewing thread hereinabove, wherein the trimethylsilyl branched diol is synthesized by means of:

(1) mixing the raw material alkene, peracetic acid and dichloromethane in the molar ratio of 1:5-10:10-15 and carrying out the reaction with stirring at 35-40° C. for 5-8 hr, after the reaction removing the solvent, and purifying and refining the product to obtain trimethylsilyl propylene epoxide;

(2) mixing water, concentrated sulfuric acid and trimethylsilyl propylene epoxide, then heating the mixture to 80-85° C. in water bath under stirring condition and holding the temperature to carry out the reaction for 10-15 min, after the reaction cooling the mixture to room temperature, and then neutralizing, distilling, separating and purifying to obtain the trimethylsilyl branched diol, wherein the concentrated sulfuric acid was one with mass concentration of 70%, and at the beginning of reaction the molar ratio of trimethylsilyl propylene epoxide to water is 1:20-40 whereas the sulfuric acid usage is 0.1-0.15 wt % of the total mixture.

When R in the molecular formula of the trimethylsilyl branched diol stands for —CH(CH₃)— or —C((CH₃)₂)—, accordingly the raw material alkene should be 3-trimethylsilyl-3-methylpropene or 3-trimethylsilyl-3,3-dimethylpropene.

In the preparing method of the polyester yarn for industrial sewing thread hereinabove, wherein the 2-tert-butyl-1,6-hexanedioic acid, the 3-tert-butyl-1,6-hexanedioic acid and the 2,5-di-tert-butyl-1,6-hexanedioic acid are synthesized by means of:

mixing tungstic acid and hydrogen peroxide and stirring the mixture at room temperature for 10-15 min, then adding in the raw material alcohol to carrying out the reaction in reflux state at 80-85° C. for 1-2 hr at first and next at 90-95° C. for 2-3 hr, after the reaction cooling, crystallizing, washing and refining to obtain the tert-butyl branched dicarboxylic acid, wherein the molar ratio of tungstic acid, the raw material alcohol and hydrogen peroxide is 1:30-40:120-150.

When the product is 2-tert-butyl-1,6-hexanedioic acid, 3-tert-butyl-1,6-hexanedioic acid and 2,5-di-tert-butyl-1,6-hexanedioic acid, accordingly the raw material alcohol should be 2-tert-butylcyclohexyl alcohol, 4-tert-butylcyclohexyl alcohol or 2,4-di-tert-butylcyclohexyl alcohol.

In the preparing method of the polyester yarn for industrial sewing thread hereinabove, wherein the $M^{x+}$ solution is an aqueous one with a concentration of 0.5-1.0 mol % and the anion is $NO_3^-$; wherein the $Sb^{3+}$ solution is a product of dissolving 5-10 mol % of $Sb_2O_3$ in oxalic acid; wherein the precipitant is ammonia water with a concentration of 2 mol/L; wherein the molar ratio of $M^{x+}$ to $Sb^{3+}$ is 1-3:100 in the blending solution before the coprecipitation ($Sb_2O_3$, as the most cost-effective polyester catalyst at present, has been modified to improve its catalytic activity in the present invention by doping it with other metal oxides, wherein the metal oxides can inhibit the crystallization and crystal growth of $Sb_2O_3$, and metal ions $M^{x+}$ can also substitute for $Sb^{3+}$ and enter the crystal lattice of $Sb_2O_3$, causing defects in $Sb_2O_3$ crystal, so as to improve the catalytic activity of $Sb_2O_3$. If the usage of doping metal oxide is too low the crystallization of $Sb_2O_3$ will be hardly affected, inversely, the effective content of $Sb^{3+}$ will decrease greatly, and both situations are unfavorable to the improvement of the catalytic activity of $Sb_2O_3$).

wherein the calcining is preceded by a washing and drying process for the precipitate, and the drying is carried out at a temperature of 105-110° C. for 2-3 hr; wherein the calcining includes steps of a 400° C. heating for 2-3 hr, a 900° C. heating for 1-2 hr and a cooling in air.

In the preparing method of the polyester yarn for industrial sewing thread hereinabove, wherein said modified polyester is prepared by means of:

(1) Esterification concocting terephthalic acid, ethylene glycol, the tert-butyl branched dicarboxylic acid and the trimethylsilyl branched diol into a slurry, then adding in the doped $Sb_2O_3$, the matting agent and the stabilizer and carrying out the esterification in a nitrogen atmosphere with a pressure of normal value-0.3 MPa at 250260° C., finally ending the reaction when the water distillation reaching more than 90% of the theoretical value;

(2) Polycondensation for the esterification products, smoothly reducing the pressure to less than 500 Pa (absolute value) within 30~50 min and carrying out reaction at 250260° C. for 30~50 min, successively, further reducing the pressure to less than 100 Pa (absolute value) and continuing the reaction at 270~282° C. for 50~90 min.

In the preparing method of the polyester yarn for industrial sewing thread hereinabove, wherein the molar ration of terephthalic acid, ethylene glycol, the tert-butyl branched dicarboxylic acid and the trimethylsilyl branched diol is 1:1.2-2.0:0.02-0.03:0.01-0.02. The additive amounts of the tert-butyl branched dicarboxylic acid and the trimethylsilyl branched diol have been optimized to modify the polyester fiber with high mechanical property, proper crystallinity and good dyeing performance, and the additive amounts could also be adjusted according to the actual application but the adjustment range should not be too large, otherwise, under the upper overflow the mechanical and crystallization performance will be effect owing to the destruction of polyester chain regularity whereas under the lower overflow the dyeing modification efficiencies cannot be fully achieved.

In the preparing method of the polyester yarn for industrial sewing thread hereinabove, being relative to terephthalic acid, the addition of the doped $Sb_2O_3$, the matting agent and the stabilizer are 0.012~0.015 wt %, 0.20~0.25 wt % and 0.01~0.05 wt %, respectively. In the prior art, the addition amount of $Sb_2O_3$ in polyester synthesis process is usually 0.02-0.04 wt % of terephthalic acid, which is so high mainly due to the low catalytic activity of undoped $Sb_2O_3$ with a low activity per unit surface area $r_s$ and a small specific surface area $S_g$, whereas in the present invention the addition amount of the catalyst could be significantly reduced through improving the catalytic activity of $Sb_2O_3$ with doping treatment.

In the preparing method of the polyester yarn for industrial sewing thread hereinabove, wherein the matting agent is titanium dioxide, and wherein the stabilizer is triphenyl phosphate, trimethyl phosphate or trimethyl phosphite;

In the preparing method of the polyester yarn for industrial sewing thread hereinabove, wherein the solid state polycondensation is to further increase the molecular weight of the modified polyester till its intrinsic viscosity reaches 1.0-1.2 dL/g.

In the preparing method of the polyester yarn for industrial sewing thread hereinabove, wherein the spinning process involves the technological parameters of 290-320° C. for the extruder temperature, 295-300° C. for the spin head temperature, 140 bar for the spin head pressure, 22° C. for the cross air temperature, 80±5% for the cross air humidity, 0.5-0.7 m/s for the cross air blow speed, 2600-3600 m/min for the winding speed.

In the preparing method of the polyester yarn for industrial sewing thread hereinabove, wherein the stretching and the heat setting processes involve the technological parameters of 440~650 m/min for the roller 1 speed, 80±5° C. for the roller 1 temperature, 460-680 m/min for the roller 2 speed, 90-100° C. for the roller 2 temperature, 1900-2400 m/min for the roller 3 speed, 125-140° C. for the roller 3 temperature, 2700-3600 m/min for the roller 4 speed, 220-250° C. for the roller 4 temperature, 2500-3600 m/min for the roller 5 speed, 150-170° C. for the roller 5 temperature.

In the present invention the polyester yarn for industrial sewing thread obtained through the preparing method hereinabove is also provided, which is a type of modified polyester filament;

wherein the modified polyester has a molecular chain structure composed of terephthalic acid segments, ethylene glycol segments, the tert-butyl branched dicarboxylic acid segments and the trimethylsilyl branched diol segments; and wherein the modified polyester is also dispersed with the doped $Sb_2O_3$ powder.

Prepared through the preferred technology program mentioned above, herein obtained polyester yarn for industrial sewing thread has the following performance indices: monofilament fineness 2-3 dtex, multifilament fineness 150-300 dtex, breaking strength ≥8.0 cN/dtex, deviation rate of linear density ±1.5%, breaking strength CV value ≤3.0%, elongation at break 13.0~16.5%, elongation at break CV value ≤8.0%, elongation at 4.0 cN/dtex load 5.5~7.0%, dry heat shrinkage (under 177° C.×10 min×0.05 cN/dtex) 6.8-9.2%, interlacing degree (5-8)±2/m, oil content 0.6±0.2 wt %, which are close to those of the common polyester industrial yarn for sewing thread obtained from the existed techniques;

herein obtained polyester yarn for industrial sewing thread has a dye uptake of 88.9-91.2% and a K/S value of 24.07-26.12 when dyed at 130° C., whereas for the contrast sample without modification of the tert-butyl branched dicarboxylic acid and the trimethylsilyl branched diol, the dye uptake and the K/S value are 84.3% and 21.56, respectively.

The mechanism of this invention could be described as follows.

In the present invention, the polyethylene terephthalate is modified by importing the tert-butyl branched dicarboxylic acid and the trimethylsilyl branched diol as comonomers as well as the doped $Sb_2O_3$ as catalyst, and the modified polyester is spun into industrial yarn via the viscosity enhancing by solid state polycondensation and the melt spinning processes. With those unconventional technologies mentioned above, the high mechanical property and good dyeing performance of the final polyester yarn have been guaranteed.

(1) On the Tert-Butyl Branched Dicarboxylic Acid and the Trimethylsilyl Branched Diol As a matter of fact, the accumulation of macromolecular chains in polymer are not so compact that there still exist some gaps between those chains, which are known as the free volumes. Enough free volumes are necessary for small molecules to diffuse and penetrate into the polymer, and within certain range, the larger the free volume, the better the diffusivity and the higher the permeability. The free volume can be classified by void one and slit one, and the void free volume is more efficient for the penetration of small molecules.

The size and class of free volume are dependent on the polymer structures such as steric hindrance, side group size and side group structure, etc. When a certain site in polymer main chain is substituted by a side group, the mobility of the main chain will be changed, as a result, the interaction force and the distance between polymer chains, as well as the cohesive energy and the free volume of polymer, will vary accordingly. In fact, the polarity, the size and length of side substitution group can draw influences on the rigid, the molecular interaction, and even the free volume of polymer. Therefore, different side groups will lead to different penetration performance.

For the dicarboxylic acids without side groups, such as isophthalic acid or adipic acid, when an H atom bonded with phenyl ring of isophthalic acid or with the methylene of adipic acid is substituted by a methyl group, the side C atom is not in the same plane as the main chain C atom. Therefore, the four sp3 hybrid orbitals in the center C will overlap with the empty orbitals on the surrounding four C atoms to form four identical a bonds, which are arranged in a tetrahedron and the four surrounding carbon atoms are located at the four vertices of the tetrahedron. Further, when the three H atoms of methyl group are all substituted, i.e., to form a tert-butyl group, a larger tetrahedrons will be constituted. The linkage between those tetrahedrons will make the polyester chain to be a zigzag conformation which ensure much more void free volumes. However, if the H atom bonded with phenyl ring of isophthalic acid or with the methylene of adipic acid is substituted by a long side chain instead of methyl group i, the increase of free volume will be mainly owing to the slit one which is not so sufficient to promote the penetration. Moreover, the long alkyl side chain is easy to cause entanglement because of its flexibility, which is also make against the increase of free volume.

Among the tert-butyl branched dicarboxylic acids involved herein, namely, 5-tert-butyl-1,3-benzoic acid, 2-tert-butyl-1,6-hexanedioic acid, 3-tert-butyl-1,6-hexanedioic acid and 2,5-di-tert-butyl-1,6-hexanedioic acid, the last three are adipic acid derivatives and their rigidities are less than that of 5-tert-butyl-1,3-benzoic acid because their aliphatic manner. Therefore, as comonomers those aliphatic dicarboxylic acids can increase the softness of polyester molecular chains, in fact, The existence of the tert-butyl branched dicarboxylic acid component in PET will change the mobility of the main chain so as to change the interaction force and the distance between PET molecular chains, finally enlarging the void free volumes of PET. Compared with short substitution chains such as methyl or ethyl group, the tert-butyl group has a larger space occupation which can gain larger free volume in the molecular aggregate. Whereas compared with long substitution chains, the tert-butyl group will mainly provide the void free volume with larger size than that of the slit free volume which generated mainly by the long side chains, furthermore, the tert-butyl group, with a higher rigidity prior to the long alkyl chains, will seldom cause the entanglement of polymer chains. Moreover, if the tert-butyl branched dicarboxylic acid becomes 5-tert-butyl-1,3-benzoic acid, much larger asymmetric segments will be formed in the polyester main chains because the eta substitution structure of phenyl ring, which not only increases the steric resistance of migration between segments, but also increases the steric resistance of rotation around the interpositional link in segments, so as to be beneficial to the increase of free volume. In conclusion, the introduction of the tert-butyl branched dicarboxylic acid will increase the void free volume of the modified polyester On the other hand, the trimethylsilyl branched diols involved herein have a molecular formula as

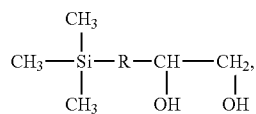

with R stands for —$CH_2$—(3-trimethylsilyl-1,2-propanediol), —$CH(CH_3)$— (3-trimethylsilyl-3-methyl-1,2-propanediol) or —$C((CH_3)_2)$— (3-trimethylsilyl-3,3-dimethyl-1,2-propanediol).

The backbone conformation of the straight-chain diols, such as ethylene glycol, is like a zigzag almost lying in a plane. When a H atom of one certain methylene group in the main chain is substituted by a methyl group, the side C atom will locate at one vertex of the tetrahedron formed by the sp3 hybridization of the connected main chain C atom. Meanwhile, the side C atom itself is of sp3 hybridization to form another tetrahedron, therefore, the methyl substitution group cannot lie in the zigzag plane. Furthermore, if the H atoms in methyl group are further substituted by other methyl groups to from a tert-butyl group more such tetrahedrons will be formed. Hence it is easy to understand the tert-butyl substituted polyester will possess a complicated molecular conformation different far from the zigzag to ensure much more void free volumes. However, if a long side chain instead of methyl group is bonded to the polyester backbone, the increase of free volume will be mainly owing to the slit one which is not so sufficient to promote the penetration. Moreover, the long alkyl side chain is easy to cause entanglement because of its flexibility, which is also make against the increase of free volume.

The existence of the trimethylsilyl branched diol in PET will change the mobility of the main chain so as to change the interaction force and the distance between PET molecular chains, finally enlarging the void free volumes of PET. Compared with short substitution chains such as methyl or ethyl group, the trimethylsilyl group has a larger space occupation which can gain larger free volume in the molecular aggregate. Whereas compared with long substitution chains, the trimethylsilyl group will mainly provide the void free volume with larger size than that of the slit free volume which generated mainly by the long side chains, furthermore, the trimethylsilyl, with a higher rigidity prior to the long alkyl chains, will seldom cause the entanglement of polymer chains. Therefore, the introduction of the trimethylsilyl branched diol will also increase the free volume of the modified polyester, especially the void free volume.

The enlargement of void free volume favorable to the penetration of water or dye molecules into the fiber has a positive effect on the dyeing of modified polyester and overcomes the dyeing difficulty of ordinary polyester due to its close molecular arrangement through reducing the dyeing temperature, shortening the dyeing time, reducing energy consumption, and improving the dye uptake of fiber.

(2) On the Doped $Sb_2O_3$ Powder

The doping modified $Sb_2O_3$ powder adopted in the synthesis of polyester is mainly as the catalyst. The existing polyester catalysts are mainly antimony compounds, such as antimony trioxide, antimony glycol and antimony acetate. The amount of antimony added in polyester synthesis is more than 200 ppm in industry. As a heavy metal, the usage of antimony catalysts has met more and more strict restrictions with the social development. Although having partly replaced antimony catalysts in today's polyester industry, titanium catalysts still have some disadvantages such as the color deterioration of polyester products and the difficulty in catalytic activity control.

The catalytic activity of the catalyst is directly proportional to the specific surface area $S_g$, the inner surface utilization f and the activity per unit surface area $r_s$. For the catalyst with certain components, the catalytic activity depends on the specific surface area $S_g$ and the inner surface utilization f. When the activity per unit surface area $r_s$ of the catalyst is constant, the larger the specific surface area is, the higher the catalytic activity is.

In the present invention, the doping and blending of metal oxide with certain catalytic activity and antimony trioxide is realized through solution blending, coprecipitation and calcination, The metal oxide is selected from more than one of MgO, CaO, BaO and ZnO, whose ion price and ion radius are different from those of antimony. These differences enable those metal ions to change the crystal structures of antimony trioxide and the related properties. In addition, MgO, CaO, BaO and ZnO are white compounds, which will not bring color change when adopted as polyester catalyst.

The influences of the metal oxides on the antimony trioxide is described as follows. As a matter of fact, after the doping the defects will be formed in $Sb_2O_3$ crystals because the doping metal oxide can inhibit the crystallization and crystal growth of $Sb_2O_3$ or entre the $Sb_2O_3$ crystal lattice through isomorphic substitution effect. Hence the specific surface area $S_g$ of catalyst $Sb_2O_3$ will be enlarged due to the deformed crystal morphology and the reduced crystal size, and the activity per unit surface area $r_s$ of $Sb_2O_3$ will also be increased because of the enrichment of doping metal in the surface of $Sb_2O_3$. Therefore, the doping will increase the catalytic activity of antimony trioxide. Otherwise, if mixing the metal oxide and antimony trioxide just through the simple mechanical blending, there is no defect will be formed in antimony trioxide and its crystallization morphologies and crystal dimensions, especially the total surface areas of crystals will keep unchanged, hence its catalytic activity can hardly be affected.

In the present invention the catalytic activity of antimony trioxide is improved to a certain extent by doping treatment, which is conducive to reducing the usage of antimony trioxide as a polyester catalyst. In the process of polyester synthesis, when the polycondensation process conditions remain unchanged and the final polyester reaches the same performance indices, the utilization of metal oxide doped antimony trioxide can be reduced by more than 30%, which effectively solves the existed problems and guarantee the high qualities of PET as well as the final fiber product.

In conclusion, the present invention provides (1) a method for preparing the polyester yarn for industrial sewing thread, wherein the antimony trioxide is doped by means of the metal oxides with certain catalytic activity so that its specific surface area $S_g$ and activity per unit surface area $r_s$ are increased thus its catalytic activity for high polymerization efficiency is improved, therefore, the addition amount of antimony catalyst in polyester synthesis can be reduced while ensuring the high quality of polyester and the emission of antimony from the polyester fiber is effectively reduced;

(2) a method for preparing the polyester yarn for industrial sewing thread, wherein the polyester is modified by importing the tert-butyl branch dicarboxylic acid and the trimethylsilyl branched diol to produce fiber that can obtain high dye uptake with lower dyeing temperature, shorter dyeing time and lower energy consumption;

(3) a type of a method for preparing the polyester yarn for industrial sewing thread with high mechanical property, good dyeing performance and wide application prospect.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

Example 1

A method for preparing the polyester yarn for industrial sewing thread, comprising the steps:

(1) Preparation of modified polyester (1.1) Doping modification of $Sb_2O_3$ (a) evenly mixing the 1.8 mol % of $Mg(NO_3)_2$ aqueous solution and the 8 mol % of $Sb_2O_3$ oxalic acid solution in a molar ratio 2:100 of $Mg^{2+}$ to $Sb^{3+}$;

(b) depositing the mixed solution by dripping in 2 mol/L of ammonia water till pH=9, then washing and drying (at 105° C. for 2.5 hr) the precipitate;

(c) after the treatments including a heating at 400° C. for 2.5 hr, a heating at 900° C. for 1.5 hr and a cooling in air, finally grinding the precipitate to obtain the doped $Sb_3$ powder with an average particle size of 0.4 micron;

(1.2) Esterification concocting terephthalic acid, ethylene glycol, 5-tert-butyl-1,3-benzoic acid and 3-trimethylsilyl-1,2-propanediol into a slurry, then adding in the doped $Sb_2O_3$, titanium dioxide and trimethyl phosphite and carrying out the esterification in a nitrogen atmosphere with a pressure of 0.3 MPa at 260° C., finally ending the reaction when the water distillation reaching more than 92% of the theoretical value, wherein the molar ration of terephthalic acid, ethylene glycol, 5-tert-butyl-1,3-benzoic acid and 3-trimethylsilyl-1,2-propanediol is 1:1.2:0.02:0.014, whereas the addition of the doped $Sb_2O_3$, titanium dioxide and trimethyl phosphite are 0.015 wt %, 0.20 wt % and 0.04 wt % of terephthalic acid, respectively;

(1.3) Polycondensation for the esterification products, smoothly reducing the pressure to 400 Pa (absolute value) within 40 min and carrying out reaction at 250° C. for 40 min, successively, further reducing the pressure to 80 Pa (absolute value) and continuing the reaction at 272° C. for 65 min;

(2) Spinning of polyester yarn for industrial sewing thread converting the modified polyester into polyester yarn for industrial sewing thread through a series of processes composed of viscosity enhancing by solid state polycondensation, melting, metering, extruding, cooling, oiling, stretching, heat setting and winding; wherein the intrinsic viscosity of the modified polyester after the solid state polycondensation is 1.0 dL/g;

wherein the spinning process involves the technological parameters of 290° C. for the extruder temperature, 295° C. for the spin head temperature, 140 bar for the spin head pressure, 22° C. for the cross air temperature, 82% for the cross air humidity, 0.7 m/s for the cross air blow speed, 2600 m/min for the winding speed;

wherein the stretching and the heat setting processes involve the technological parameters of 440 m/min for the roller 1 speed, 75° C. for the roller 1 temperature, 520 m/min for the roller 2 speed, 90° C. for the roller 2 temperature, 2400 m/min for the roller 3 speed, 130° C. for the roller 3 temperature, 2800 m/min for the roller 4 speed, 250° C. for the roller 4 temperature, 2500 m/min for the roller 5 speed, 155° C. for the roller 5 temperature.

Finally obtained degradable polyester fiber has the following performance indices of monofilament fineness 2 dtex, multifilament fineness 150 dtex, breaking strength 8.0 cN/dtex, deviation rate of linear density −0.6%, breaking strength CV value 2.8%, elongation at break 14.05%, elongation at break CV value 8.0%, elongation at 4.0 cN/dtex load 7.0%, dry heat shrinkage (under 177° C.×10 min×0.05 cN/dtex) 7.6%, interlacing degree 5/m, oil content 0.4 wt %, as well as a dye uptake of 89.17% and a K/S value of 26.12 when dyed at 130° C.

Comparison 1

A method for preparing the polyester yarn for industrial sewing thread involved steps basically the same as those in Example 1, except for no addition of 5-tert-butyl-1,3-benzoic acid, 3-trimethylsilyl-1,2-propanediol and the doped $Sb_2O_3$, i.e., no modification for the polyester, from which the finally obtained polyester fiber has the following performance indices of monofilament fineness 2 dtex, multifilament fineness 150 dtex, breaking strength 8.1 cN/dtex, deviation rate of linear density −0.6%, breaking strength CV value 2.8%, elongation at break 13.75%, elongation at break CV value 8.0%, elongation at 4.0 cN/dtex load 7.0%, dry heat shrinkage (under 177° C.×10 min×0.05 cN/dtex) 7.6%, interlacing degree 5/m, oil content 0.4 wt %, as well as a dye uptake of 86.36% and a K/S value of 22.68 when dyed at 130° C.

From results of Example 1 and Comparison 1, it can be found that the introducing of 5-tert-butyl-1,3-benzoic acid and 3-trimethylsilyl-1,2-propanediol can enlarge the void free volume of the polyester so as to promote the penetration of dye molecules into inner fiber and increase the dye uptake, moreover, the addition of the doped $Sb_2O_3$ can reduce the usage of polymerization catalyst so as to realize the environmental protection production while ensuring the high quality of final fiber.

Comparison 2

A method for preparing the degradable polyester fiber involved steps basically the same as those in Example 1, except for adopting 1,2-dodecyl glycol instead of 3-trimethylsilyl-1,2-propanediol and 5-tert-butyl-1,3-benzoic acid in step (1), from which the finally obtained polyester fiber has the following performance indices of monofilament fineness 2 dtex, multifilament fineness 150 dtex, breaking strength 8.2 cN/dtex, deviation rate of linear density −0.6%, breaking strength CV value 2.8%, elongation at break 13.53%, elongation at break CV value 8.0%, elongation at 4.0 cN/dtex load 7.0%, dry heat shrinkage (under 177° C.×10 min×0.05 cN/dtex) 7.6%, interlacing degree 5/m, oil content 0.4 wt %, as well as a dye uptake of 86.45% and a K/S value of 22.87 when dyed at 130° C.

From results of Example 1 and Comparison 1, it can be found that the utilization of 3-trimethylsilyl-1,2-propanediol and 5-tert-butyl-1,3-benzoic acid will be more effective in improving the mechanical properties such as elongation intensity of the polyester fiber than 1,2-dodecyl glycol, and the reason at first is that 3-trimethylsilyl-1,2-propanediol and 5-tert-butyl-1,3-benzoic acid are mainly conducive to enlarge the void free volume whereas the 1,2-dodecyl glycol is mainly contribute to the slit free volume, on the other hand, the tert-butyl groups in 3-trimethylsilyl-1,2-propanediol and 5-tert-butyl-1,3-benzoic acid possess a higher rigidity prior to the long alkyl chains so as to seldom cause the entanglement of polymer chains, therefore, 3-trimethylsilyl-1,2-propanediol and 5-tert-butyl-1,3-benzoic acid can gain much more free volume in the polyester, which is favorable to the penetration of dye into the fiber so as to improve the dye uptake while reducing the dyeing temperature, shortening the dyeing time, reducing energy consumption.

Example 2

A method for preparing the polyester yarn for industrial sewing thread, comprising the steps:

(1) Preparation of modified polyester (1.1) Synthesis of 3-trimethylsilyl-3-methyl-1,2-propanediol (a) mixing 3-trimethylsilyl-3-methylpropene, peracetic acid and dichloromethane in the molar ratio of 1:5:10 and carrying out the reaction with stirring at 35° C. for 5 hr, after the reaction removing the solvent, and purifying and refining the product to obtain trimethylsilyl propylene epoxide;

(b) mixing water, concentrated sulfuric acid and trimethylsilyl propylene epoxide, then heating the mixture to 80° C. in water bath under stirring condition and holding the temperature to carry out the reaction for 10 min, after the reaction cooling the mixture to room temperature, and then neutralizing, distilling, separating and purifying to obtain the trimethylsilyl branched diol (R=—CH(CH$_3$)— in Formula (I)), wherein the concentrated sulfuric acid was one with mass concentration of 70%, and at the beginning of reaction the molar ratio of trimethylsilyl propylene epoxide to water is 1:20 whereas the sulfuric acid usage is 0.1 wt % of the total mixture.

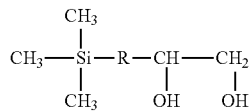

Formula (I)

(1.2) Synthesis of 2-tert-butyl-1,6-hexanedioic acid mixing tungstic acid and hydrogen peroxide and stirring the mixture at room temperature for 10 min, then adding in 2-tert-butyl cyclohexanol to carrying out the reaction in reflux state at 80° C. for 1 hr at first and next at 94° C. for 2 hr, after the reaction cooling, crystallizing, washing and refining to obtain the tert-butyl branched dicarboxylic acid, wherein the molar ratio of tungstic acid, 2-tert-butyl cyclohexanol and hydrogen peroxide is 1:35:120.

(1.3) Doping modification of $Sb_2O_3$ (1.3.1) evenly mixing the 0.5 mol % of $Ca(NO_3)_2$ aqueous solution and the 5 mol % of $Sb_2O_3$ oxalic acid solution in a molar ratio 1:100 of $Ca^{2+}$ to $Sb^{3+}$;

(1.3.2) depositing the mixed solution by dripping in 2 mol/L of ammonia water till pH=10, then washing and drying (at 110° C. for 2 hr) the precipitate;

(1.3.3) after the treatments including a heating at 400° C. for 2 hr, a heating at 900° C. for 1 hr and a cooling in air, finally grinding the precipitate to obtain the doped $Sb_3$ powder with an average particle size of 0.4 micron;

(1.4) Esterification concocting terephthalic acid, ethylene glycol, 2-tert-butyl-1,6-hexanedioic acid and 3-trimethylsilyl-3-methyl-1,2-propanediol into a slurry, then adding in the doped $Sb_2O_3$, titanium dioxide and trimethyl phosphite and carrying out the esterification in a nitrogen atmosphere with a pressure of 0.3 MPa at 260° C., finally ending the reaction when the water distillation reaching more than 92% of the theoretical value, wherein the molar ration of terephthalic acid, ethylene glycol, 2-tert-butyl-1,6-hexanedioic acid and 3-trimethylsilyl-3-methyl-1,2-propanediol is 1:1.2:0.03:0.01, whereas the addition of the doped $Sb_2O_3$, titanium dioxide and trimethyl phosphite are 0.0135 wt %, 0.25 wt % and 0.01 wt % of terephthalic acid, respectively;

(1.5) Polycondensation for the esterification products, smoothly reducing the pressure to 400 Pa (absolute value) within 40 min and carrying out reaction at 250° C. for 40 min, successively, further reducing the pressure to 80 Pa (absolute value) and continuing the reaction at 270° C. for 50 min;

(2) Spinning of polyester yarn for industrial sewing thread converting the modified polyester into polyester yarn for industrial sewing thread through a series of processes composed of viscosity enhancing by solid state polycondensation, melting, metering, extruding, cooling, oiling, stretching, heat setting and winding; wherein the intrinsic viscosity of the modified polyester after the solid state polycondensation is 1.1 dL/g;

wherein the spinning process involves the technological parameters of 290° C. for the extruder temperature, 300° C. for the spin head temperature, 140 bar for the spin head pressure, 22° C. for the cross air temperature, 75% for the cross air humidity, 0.6 m/s for the cross air blow speed, 2900 m/min for the winding speed;

wherein the stretching and the heat setting processes involve the technological parameters of 650 m/min for the roller 1 speed, 80° C. for the roller 1 temperature, 460 m/min for the roller 2 speed, 100° C. for the roller 2 temperature, 2000 m/min for the roller 3 speed, 125° C. for the roller 3 temperature, 3000 m/min for the roller 4 speed, 230° C. for the roller 4 temperature, 3600 m/min for the roller 5 speed, 160° C. for the roller 5 temperature.

Finally obtained degradable polyester fiber has the following performance indices of monofilament fineness 2 dtex, multifilament fineness 300 dtex, breaking strength 8.3 cN/dtex, deviation rate of linear density −1.5%, breaking strength CV value 2.8%, elongation at break 13.0%, elongation at break CV value 7.9%, elongation at 4.0 cN/dtex load 6.5%, dry heat shrinkage (under 177° C.×10 min×0.05 cN/dtex) 7.7%, interlacing degree 3/m, oil content 0.6 wt %, as well as a dye uptake of 88.8% and a K/S value of 25.32 when dyed at 130° C.

Example 3

A method for preparing the polyester yarn for industrial sewing thread, comprising the steps:
(1) Preparation of modified polyester
(1.1) Synthesis of 3-trimethylsilyl-3-methyl-1,2-propanediol
(a) mixing 3-trimethylsilyl-3-methylpropene, peracetic acid and dichloromethane in the molar ratio of 1:10:15 and carrying out the reaction with stirring at 40° C. for 8 hr, after the reaction removing the solvent, and purifying and refining the product to obtain trimethylsilyl propylene epoxide;
(b) mixing water, concentrated sulfuric acid and trimethylsilyl propylene epoxide, then heating the mixture to 85° C. in water bath under stirring condition and holding the temperature to carry out the reaction for 15 min, after the reaction cooling the mixture to room temperature, and then neutralizing, distilling, separating and purifying to obtain the trimethylsilyl branched diol (R=—CH(CH$_3$)— in Formula (I)), wherein the concentrated sulfuric acid was one with mass concentration of 70%, and at the beginning of reaction the molar ratio of trimethylsilyl propylene epoxide to water is 1:40 whereas the sulfuric acid usage is 0.15 wt % of the total mixture.
(1.2) Synthesis of 2-tert-butyl-1,6-hexanedioic acid
mixing tungstic acid and hydrogen peroxide and stirring the mixture at room temperature for 12 min, then adding in 2-tert-butyl cyclohexanol to carrying out the reaction in reflux state at 83° C. for 1.5 hr at first and next at 90° C. for 2 hr, after the reaction cooling, crystallizing, washing and refining to obtain the tert-butyl branched dicarboxylic acid, wherein the molar ratio of tungstic acid, 2-tert-butyl cyclohexanol and hydrogen peroxide is 1:33:120.
(1.3) Doping modification of Sb$_2$O$_3$
(1.3.1) evenly mixing the 1.0 mol % of Ba(NO$_3$)$_2$ aqueous solution and the 10 mol % of Sb$_2$O$_3$ oxalic acid solution in a molar ratio 3:100 of Ba$^{2+}$ to Sb$^{3+}$;
(1.3.2) depositing the mixed solution by dripping in 2 mol/L of ammonia water till pH=9.5, then washing and drying (at 105° C. for 3 hr) the precipitate;
(1.3.3) after the treatments including a heating at 400° C. for 3 hr, a heating at 900° C. for 2 hr and a cooling in air, finally grinding the precipitate to obtain the doped Sb$_3$ powder with an average particle size of 0.5 micron;
(1.4) Esterification
concocting terephthalic acid, ethylene glycol, 2-tert-butyl-1,6-hexanedioic acid and 3-trimethylsilyl-3-methyl-1,2-propanediol into a slurry, then adding in the doped Sb$_2$O$_3$, titanium dioxide and triphenyl phosphate and carrying out the esterification in a nitrogen atmosphere with a pressure of 0.2 MPa at 255° C., finally ending the reaction when the water distillation reaching more than 90% of the theoretical value, wherein the molar ration of terephthalic acid, ethylene glycol, 2-tert-butyl-1,6-hexanedioic acid and 3-trimethylsilyl-3-methyl-1,2-propanediol is 1:1.6:0.02:0.01, whereas the addition of the doped Sb$_2$O$_3$, titanium dioxide and triphenyl phosphate are 0.012 wt %, 0.21 wt % and 0.03 wt % of terephthalic acid, respectively;
(1.5) Polycondensation
for the esterification products, smoothly reducing the pressure to 450 Pa (absolute value) within 45 min and carrying out reaction at 256° C. for 50 min, successively, further reducing the pressure to 100 Pa (absolute value) and continuing the reaction at 275° C. for 60 min;

(2) Spinning of polyester yarn for industrial sewing thread
converting the modified polyester into polyester yarn for industrial sewing thread through a series of processes composed of viscosity enhancing by solid state polycondensation, melting, metering, extruding, cooling, oiling, stretching, heat setting and winding; wherein the intrinsic viscosity of the modified polyester after the solid state polycondensation is 1.0 dL/g;
wherein the spinning process involves the technological parameters of 300° C. for the extruder temperature, 295° C. for the spin head temperature, 140 bar for the spin head pressure, 22° C. for the cross air temperature, 80% for the cross air humidity, 0.7 m/s for the cross air blow speed, 3600 m/min for the winding speed;
wherein the stretching and the heat setting processes involve the technological parameters of 440 m/min for the roller 1 speed, 80° C. for the roller 1 temperature, 460 m/min for the roller 2 speed, 90° C. for the roller 2 temperature, 1900 m/min for the roller 3 speed, 125° C. for the roller 3 temperature, 3600 m/min for the roller 4 speed, 220° C. for the roller 4 temperature, 3300 m/min for the roller 5 speed, 170° C. for the roller 5 temperature.
Finally obtained degradable polyester fiber has the following performance indices of monofilament fineness 2.6 dtex, multifilament fineness 150 dtex, breaking strength 8.1 cN/dtex, deviation rate of linear density 0%, breaking strength CV value 3.0%, elongation at break 13.0%, elongation at break CV value 7.95%, elongation at 4.0 cN/dtex load 5.5%, dry heat shrinkage (under 177° C.×10 min×0.05 cN/dtex) 9.2%, interlacing degree 7/m, oil content 0.6 wt %, as well as a dye uptake of 88.8% and a K/S value of 24.07 when dyed at 130° C.

Example 4

A method for preparing the polyester yarn for industrial sewing thread, comprising the steps:
(1) Preparation of modified polyester
(1.1) Synthesis of 3-trimethylsilyl-3-methyl-1,2-propanediol
(a) mixing 3-trimethylsilyl-3-methylpropene, peracetic acid and dichloromethane in the molar ratio of 1:10:10 and carrying out the reaction with stirring at 36° C. for 6 hr, after the reaction removing the solvent, and purifying and refining the product to obtain trimethylsilyl propylene epoxide;
(b) mixing water, concentrated sulfuric acid and trimethylsilyl propylene epoxide, then heating the mixture to 84° C. in water bath under stirring condition and holding the temperature to carry out the reaction for 12 min, after the reaction cooling the mixture to room temperature, and then neutralizing, distilling, separating and purifying to obtain the trimethylsilyl branched diol (R=—CH(CH$_3$)— in Formula (I)), wherein the concentrated sulfuric acid was one with mass concentration of 70%, and at the beginning of reaction the molar ratio of trimethylsilyl propylene epoxide to water is 1:30 whereas the sulfuric acid usage is 0.14 wt % of the total mixture.
(1.2) Synthesis of 3-tert-butyl-1,6-hexanedioic acid
mixing tungstic acid and hydrogen peroxide and stirring the mixture at room temperature for 13 min, then adding in 4-tert-butyl cyclohexanol to carrying out the reaction in reflux state at 85° C. for 2 hr at first and next at 90° C. for 3 hr, after the reaction cooling, crystallizing, washing and refining to obtain the tert-butyl branched dicarboxylic acid, wherein the molar ratio of tungstic acid, 4-tert-butyl cyclohexanol and hydrogen peroxide is 1:30:130.
(1.3) Doping modification of Sb$_2$O$_3$
(1.3.1) evenly mixing the 0.6 mol % of Zn(NO$_3$)$_2$ aqueous solution and the 6 mol % of Sb$_2$O$_3$ oxalic acid solution in a molar ratio 1.2:100 of Zn$^{2+}$ to Sb$^{3+}$;

(1.3.2) depositing the mixed solution by dripping in 2 mol/L of ammonia water till pH=10 then washing and drying (at 110° C. for 2.5 hr) the precipitate;

(1.3.3) after the treatments including a heating at 400° C. for 2.5 hr, a heating at 900° C. for 1 hr and a cooling in air, finally grinding the precipitate to obtain the doped $Sb_3$ powder with an average particle size of 0.4 micron;

(1.4) Esterification concocting terephthalic acid, ethylene glycol, 3-tert-butyl-1,6-hexanedioic acid and 3-trimethylsilyl-3-methyl-1,2-propanediol into a slurry, then adding in the doped $Sb_2O_3$, titanium dioxide and trimethyl phosphite and carrying out the esterification in a nitrogen atmosphere with a pressure of 0.1 MPa at 250° C., finally ending the reaction when the water distillation reaching more than 90% of the theoretical value, wherein the molar ration of terephthalic acid, ethylene glycol, 3-tert-butyl-1,6-hexanedioic acid and 3-trimethylsilyl-3-methyl-1,2-propanediol is 1:1.7:0.025:0.02, whereas the addition of the doped $Sb_2O_3$, titanium dioxide and trimethyl phosphite are 0.012 wt %, 0.20 wt % and 0.02 wt % of terephthalic acid, respectively;

(1.5) Polycondensation for the esterification products, smoothly reducing the pressure to 420 Pa (absolute value) within 50 min and carrying out reaction at 260° C. for 35 min, successively, further reducing the pressure to 85 Pa (absolute value) and continuing the reaction at 270° C. for 90 min;

(2) Spinning of polyester yarn for industrial sewing thread converting the modified polyester into polyester yarn for industrial sewing thread through a series of processes composed of viscosity enhancing by solid state polycondensation, melting, metering, extruding, cooling, oiling, stretching, heat setting and winding; wherein the intrinsic viscosity of the modified polyester after the solid state polycondensation is 1.0 dL/g;

wherein the spinning process involves the technological parameters of 310° C. for the extruder temperature, 296° C. for the spin head temperature, 140 bar for the spin head pressure, 22° C. for the cross air temperature, 85% for the cross air humidity, 0.5 m/s for the cross air blow speed, 2600 m/min for the winding speed;

wherein the stretching and the heat setting processes involve the technological parameters of 520 m/min for the roller 1 speed, 82° C. for the roller 1 temperature, 680 m/min for the roller 2 speed, 96° C. for the roller 2 temperature, 1900 m/min for the roller 3 speed, 140° C. for the roller 3 temperature, 2700 m/min for the roller 4 speed, 220° C. for the roller 4 temperature, 3300 m/min for the roller 5 speed, 150° C. for the roller 5 temperature.

Finally obtained degradable polyester fiber has the following performance indices of monofilament fineness 2.3 dtex, multifilament fineness 200 dtex, breaking strength 8.5 cN/dtex, deviation rate of linear density 1.0%, breaking strength CV value 2.8%, elongation at break 16.5%, elongation at break CV value 7.6%, elongation at 4.0 cN/dtex load 5.5%, dry heat shrinkage (under 177° C.×10 min×0.05 cN/dtex) 6.8%, interlacing degree 8/m, oil content 0.8 wt %, as well as a dye uptake of 91.2% and a K/S value of 24.07 when dyed at 130° C.

Example 5

A method for preparing the polyester yarn for industrial sewing thread, comprising the steps:

(1) Preparation of modified polyester (1.1) Synthesis of 3-trimethylsilyl-3,3-dimethyl-1,2-propanediol (a) mixing 3-trimethylsilyl-3,3-dimethylpropene, peracetic acid and dichloromethane in the molar ratio of 1:8:12 and carrying out the reaction with stirring at 40° C. for 5 hr, after the reaction removing the solvent, and purifying and refining the product to obtain trimethylsilyl propylene epoxide;

(b) mixing water, concentrated sulfuric acid and trimethylsilyl propylene epoxide, then heating the mixture to 85° C. in water bath under stirring condition and holding the temperature to carry out the reaction for 10 min, after the reaction cooling the mixture to room temperature, and then neutralizing, distilling, separating and purifying to obtain the trimethylsilyl branched diol (R=—$C((CH_3)_2)$— in Formula (I)), wherein the concentrated sulfuric acid was one with mass concentration of 70%, and at the beginning of reaction the molar ratio of trimethylsilyl propylene epoxide to water is 1:25 whereas the sulfuric acid usage is 0.12 wt % of the total mixture.

(1.2) Synthesis of 3-tert-butyl-1,6-hexanedioic acid mixing tungstic acid and hydrogen peroxide and stirring the mixture at room temperature for 14 min, then adding in 4-tert-butyl cyclohexanol to carrying out the reaction in reflux state at 82° C. for 2 hr at first and next at 92° C. for 3 hr, after the reaction cooling, crystallizing, washing and refining to obtain the tert-butyl branched dicarboxylic acid, wherein the molar ratio of tungstic acid, 4-tert-butyl cyclohexanol and hydrogen peroxide is 1:40:130.

(1.3) Doping modification of $Sb_2O_3$ (1.3.1) evenly mixing the 0.7 mol % of $Mg(NO_3)_2$ aqueous solution and the 8 mol % of $Sb_2O_3$ oxalic acid solution in a molar ratio 2:100 of $Mg^{2+}$ to $Sb^{3+}$;

(1.3.2) depositing the mixed solution by dripping in 2 mol/L of ammonia water till pH=10 then washing and drying (at 110° C. for 2.5 hr) the precipitate;

(1.3.3) after the treatments including a heating at 400° C. for 2.5 hr, a heating at 900° C. for 2 hr and a cooling in air, finally grinding the precipitate to obtain the doped $Sb_3$ powder with an average particle size of 0.5 micron;

(1.4) Esterification concocting terephthalic acid, ethylene glycol, 3-tert-butyl-1,6-hexanedioic acid and 3-trimethylsilyl-3,3-dimethyl-1,2-propanediol into a slurry, then adding in the doped $Sb_2O_3$, titanium dioxide and trimethyl phosphate and carrying out the esterification in a nitrogen atmosphere with a pressure of 0.3 MPa at 252° C., finally ending the reaction when the water distillation reaching more than 90% of the theoretical value, wherein the molar ration of terephthalic acid, ethylene glycol, 3-tert-butyl-1,6-hexanedioic acid and 3-trimethylsilyl-3,3-dimethyl-1,2-propanediol is 1:2.0:0.023:0.017, whereas the addition of the doped $Sb_2O_3$, titanium dioxide and trimethyl phosphate are 0.015 wt %, 0.24 wt % and 0.01 wt % of terephthalic acid, respectively;

(1.5) Polycondensation for the esterification products, smoothly reducing the pressure to 500 Pa (absolute value) within 30 min and carrying out reaction at 256° C. for 45 min, successively, further reducing the pressure to 88 Pa (absolute value) and continuing the reaction at 280° C. for 75 min;

(2) Spinning of polyester yarn for industrial sewing thread converting the modified polyester into polyester yarn for industrial sewing thread through a series of processes composed of viscosity enhancing by solid state polycondensation, melting, metering, extruding, cooling, oiling, stretching, heat setting and winding; wherein the intrinsic viscosity of the modified polyester after the solid state polycondensation is 1.2 dL/g;

wherein the spinning process involves the technological parameters of 320° C. for the extruder temperature, 297° C. for the spin head temperature, 140 bar for the spin head pressure, 22° C. for the cross air temperature, 83% for the cross air humidity, 0.7 m/s for the cross air blow speed, 2600 m/min for the winding speed;

wherein the stretching and the heat setting processes involve the technological parameters of 600 m/min for the roller 1 speed, 85° C. for the roller 1 temperature, 550 m/min for the roller 2 speed, 96° C. for the roller 2 temperature, 2400 m/min for the roller 3 speed, 135° C. for the roller 3 temperature, 2700 m/min for the roller 4 speed, 250° C. for the roller 4 temperature, 2600 m/min for the roller 5 speed, 150° C. for the roller 5 temperature.

Finally obtained degradable polyester fiber has the following performance indices of monofilament fineness 3 dtex, multifilament fineness 260 dtex, breaking strength 8.5 cN/dtex, deviation rate of linear density 1.5%, breaking strength CV value 2.7%, elongation at break 14.8%, elongation at break CV value 7.7%, elongation at 4.0 cN/dtex load 7.0%, dry heat shrinkage (under 177° C.×10 min×0.05 cN/dtex) 6.8%, interlacing degree 10/m, oil content 0.6 wt %, as well as a dye uptake of 89.29% and a K/S value of 26.12 when dyed at 130° C.

Example 6

A method for preparing the polyester yarn for industrial sewing thread, comprising the steps:

(1) Preparation of modified polyester (1.1) Synthesis of 3-trimethylsilyl-3,3-dimethyl-1,2-propanediol (a) mixing 3-trimethylsilyl-3,3-dimethylpropene, peracetic acid and dichloromethane in the molar ratio of 1:10:10 and carrying out the reaction with stirring at 35° C. for 6 hr, after the reaction removing the solvent, and purifying and refining the product to obtain trimethylsilyl propylene epoxide;

(b) mixing water, concentrated sulfuric acid and trimethylsilyl propylene epoxide, then heating the mixture to 80° C. in water bath under stirring condition and holding the temperature to carry out the reaction for 15 min, after the reaction cooling the mixture to room temperature, and then neutralizing, distilling, separating and purifying to obtain the trimethylsilyl branched diol (R=—C((CH$_3$)$_2$)— in Formula (I)), wherein the concentrated sulfuric acid was one with mass concentration of 70%, and at the beginning of reaction the molar ratio of trimethylsilyl propylene epoxide to water is 1:35 whereas the sulfuric acid usage is 0.14 wt % of the total mixture.

(1.2) Synthesis of 2,5-di-tert-butyl-1,6-hexanedioic acid mixing tungstic acid and hydrogen peroxide and stirring the mixture at room temperature for 15 min, then adding in 2,4-di-tert-butyl cyclohexanol to carrying out the reaction in reflux state at 83° C. for 1.5 hr at first and next at 92° C. for 2.5 hr, after the reaction cooling, crystallizing, washing and refining to obtain the tert-butyl branched dicarboxylic acid, wherein the molar ratio of tungstic acid, 2,4-di-tert-butyl cyclohexanol and hydrogen peroxide is 1:40:120.

(1.3) Doping modification of Sb$_2$O$_3$ (1.3.1) evenly mixing the 0.8 mol % of Mg(NO$_3$)$_2$ and Ca(NO$_3$)$_2$ aqueous solutions in a weight ratio of 1:1 at first, and then blending the mixture containing M$^{x+}$ ions with the 8 mol % of Sb$_2$O$_3$ oxalic acid solution in a molar ratio 2.5:100 of M$^{x+}$ to Sb$^{3+}$;

(1.3.2) depositing the mixed solution by dripping in 2 mol/L of ammonia water till pH=10 then washing and drying (at 105° C. for 3 hr) the precipitate;

(1.3.3) after the treatments including a heating at 400° C. for 3 hr, a heating at 900° C. for 1.5 hr and a cooling in air, finally grinding the precipitate to obtain the doped Sb$_3$ powder with an average particle size of 0.4 micron;

(1.4) Esterification concocting terephthalic acid, ethylene glycol, 2,5-di-tert-butyl-1,6-hexanedioic acid and 3-trimethylsilyl-3,3-dimethyl-1,2-propanediol into a slurry, then adding in the doped Sb$_2$O$_3$, titanium dioxide and triphenyl phosphate and carrying out the esterification in a nitrogen atmosphere with a pressure of normal value at 260° C., finally ending the reaction when the water distillation reaching more than 95% of the theoretical value, wherein the molar ration of terephthalic acid, ethylene glycol, 2,5-di-tert-butyl-1,6-hexanedioic acid and 3-trimethylsilyl-3,3-dimethyl-1,2-propanediol is 1:2.0:0.03:0.02, whereas the addition of the doped Sb$_2$O$_3$, titanium dioxide and triphenyl phosphate are 0.014 wt %, 0.21 wt % and 0.05 wt % of terephthalic acid, respectively;

(1.5) Polycondensation for the esterification products, smoothly reducing the pressure to 490 Pa (absolute value) within 30 min and carrying out reaction at 260° C. for 50 min, successively, further reducing the pressure to 90 Pa (absolute value) and continuing the reaction at 275° C. for 50 min;

(2) Spinning of polyester yarn for industrial sewing thread converting the modified polyester into polyester yarn for industrial sewing thread through a series of processes composed of viscosity enhancing by solid state polycondensation, melting, metering, extruding, cooling, oiling, stretching, heat setting and winding; wherein the intrinsic viscosity of the modified polyester after the solid state polycondensation is 1.2 dL/g;

wherein the spinning process involves the technological parameters of 320° C. for the extruder temperature, 300° C. for the spin head temperature, 140 bar for the spin head pressure, 22° C. for the cross air temperature, 85% for the cross air humidity, 0.6 m/s for the cross air blow speed, 2600 m/min for the winding speed;

wherein the stretching and the heat setting processes involve the technological parameters of 650 m/min for the roller 1 speed, 85° C. for the roller 1 temperature, 680 m/min for the roller 2 speed, 100° C. for the roller 2 temperature, 2200 m/min for the roller 3 speed, 140° C. for the roller 3 temperature, 2700 m/min for the roller 4 speed, 240° C. for the roller 4 temperature, 2800 m/min for the roller 5 speed, 150° C. for the roller 5 temperature.

Finally obtained degradable polyester fiber has the following performance indices of monofilament fineness 3 dtex, multifilament fineness 300 dtex, breaking strength 8.0 cN/dtex, deviation rate of linear density −1.5%, breaking strength CV value 3.0%, elongation at break 16.5%, elongation at break CV value 7.9%, elongation at 4.0 cN/dtex load 6.5%, dry heat shrinkage (under 177° C.×10 min×0.05 cN/dtex) 6.8%, interlacing degree 8/m, oil content 0.4 wt %, as well as a dye uptake of 91.2% and a K/S value of 24.59 when dyed at 130° C.

Example 7

A method for preparing the polyester yarn for industrial sewing thread, comprising the steps:

(1) Preparation of modified polyester (1.1) Synthesis of 3-trimethylsilyl-3,3-dimethyl-1,2-propanediol (a) mixing 3-trimethylsilyl-3,3-dimethylpropene, peracetic acid and dichloromethane in the molar ratio of 1:5:15 and carrying out the reaction with stirring at 37° C. for 7 hr, after the reaction removing the solvent, and purifying and refining the product to obtain trimethylsilyl propylene epoxide;

(b) mixing water, concentrated sulfuric acid and trimethylsilyl propylene epoxide, then heating the mixture to 82° C. in water bath under stirring condition and holding the temperature to carry out the reaction for 12 min, after the reaction cooling the mixture to room temperature, and then neutralizing, distilling, separating and purifying to obtain the trimethylsilyl branched diol (R=—C((CH$_3$)$_2$)— in Formula (I)), wherein the concentrated sulfuric acid was one with mass concentration of 70%, and at the beginning of reaction the molar ratio of trimethylsilyl propylene epoxide to water is 1:29 whereas the sulfuric acid usage is 0.13 wt % of the total mixture.

(1.2) Synthesis of 2,5-di-tert-butyl-1,6-hexanedioic acid mixing tungstic acid and hydrogen peroxide and stirring the mixture at room temperature for 11 min, then adding in 2,4-di-tert-butyl cyclohexanol to carrying out the reaction in reflux state at 80° C. for 1 hr at first and next at 95° C. for 2.2 hr, after the reaction cooling, crystallizing, washing and refining to obtain the tert-butyl branched dicarboxylic acid, wherein the molar ratio of tungstic acid, 2,4-di-tert-butyl cyclohexanol and hydrogen peroxide is 1:35:150.

(1.3) Doping modification of Sb$_2$O$_3$ (1.3.1) evenly mixing the 0.5 mol % of Mg(NO$_3$)$_2$, Ba(NO$_3$)$_2$ and Ca(NO$_3$)$_2$ aqueous solutions in a weight ratio of 1:1:1 at first, and then blending the mixture containing M$^{x+}$ ions with the 10 mol % of Sb$_2$O$_3$ oxalic acid solution in a molar ratio 2:100 of M$^{x+}$ to Sb$^{3+}$;

(1.3.2) depositing the mixed solution by dripping in 2 mol/L of ammonia water till pH=9 then washing and drying (at 108° C. for 2.5 hr) the precipitate;

(1.3.3) after the treatments including a heating at 400° C. for 2.5 hr, a heating at 900° C. for 2 hr and a cooling in air, finally grinding the precipitate to obtain the doped Sb$_3$ powder with an average particle size of 0.4 micron;

(1.4) Esterification concocting terephthalic acid, ethylene glycol, 2,5-di-tert-butyl-1,6-hexanedioic acid and 3-trimethylsilyl-3,3-dimethyl-1,2-propanediol into a slurry, then adding in the doped Sb$_2$O$_3$, titanium dioxide and trimethyl phosphite and carrying out the esterification in a nitrogen atmosphere with a pressure of 0.2 MPa at 250° C., finally ending the reaction when the water distillation reaching more than 92% of the theoretical value, wherein the molar ration of terephthalic acid, ethylene glycol, 2,5-di-tert-butyl-1,6-hexanedioic acid and 3-trimethylsilyl-3,3-dimethyl-1,2-propanediol is 1:1.5:0.02:0.017, whereas the addition of the doped Sb$_2$O$_3$, titanium dioxide and trimethyl phosphite are 0.015 wt %, 0.25 wt % and 0.03 wt % of terephthalic acid, respectively;

(1.5) Polycondensation for the esterification products, smoothly reducing the pressure to 440 Pa (absolute value) within 40 min and carrying out reaction at 260° C. for 40 min, successively, further reducing the pressure to 95 Pa (absolute value) and continuing the reaction at 282° C. for 70 min;

(2) Spinning of polyester yarn for industrial sewing thread converting the modified polyester into polyester yarn for industrial sewing thread through a series of processes composed of viscosity enhancing by solid state polycondensation, melting, metering, extruding, cooling, oiling, stretching, heat setting and winding; wherein the intrinsic viscosity of the modified polyester after the solid state polycondensation is 1.0 dL/g;

wherein the spinning process involves the technological parameters of 300° C. for the extruder temperature, 295° C. for the spin head temperature, 140 bar for the spin head pressure, 22° C. for the cross air temperature, 79% for the cross air humidity, 0.7 m/s for the cross air blow speed, 3000 m/min for the winding speed;

wherein the stretching and the heat setting processes involve the technological parameters of 440 m/min for the roller 1 speed, 75° C. for the roller 1 temperature, 580 m/min for the roller 2 speed, 90° C. for the roller 2 temperature, 2400 m/min for the roller 3 speed, 135° C. for the roller 3 temperature, 3600 m/min for the roller 4 speed, 250° C. for the roller 4 temperature, 3000 m/min for the roller 5 speed, 170° C. for the roller 5 temperature.

Finally obtained degradable polyester fiber has the following performance indices of monofilament fineness 2.5 dtex, multifilament fineness 150 dtex, breaking strength 8.2 cN/dtex, deviation rate of linear density 1.5%, breaking strength CV value 2.8%, elongation at break 15.0%, elongation at break CV value 7.8%, elongation at 4.0 cN/dtex load 7.0%, dry heat shrinkage (under 177° C.×10 min×0.05 cN/dtex) 9.2%, interlacing degree 6/m, oil content 0.6 wt %, as well as a dye uptake of 90.28% and a K/S value of 26.12 when dyed at 130° C.

What is claimed is:

1. A preparing method for a polyester yarn for an industrial sewing thread, comprising: manufacturing a filament from a modified polyester through a series of processes composed of viscosity enhancing by a solid state polycondensation, melting, metering, extruding, cooling, oiling, stretching, heat setting and winding;
   wherein the modified polyester is a product of an esterification and a polycondensation of evenly mixed terephthalic acid, ethylene glycol, a tert-butyl branched dicarboxylic acid, a trimethylsilyl branched diol and a doped Sb$_2$O$_3$ powder;
   wherein the tert-butyl branched dicarboxylic acid is selected from the group consisting of 5-tert-butyl-1,3-benzoic acid, 2-tert-butyl-1,6-hexanedioic acid, 3-tert-butyl-1,6-hexanedioic acid and 2,5-di-tert-butyl-1,6-hexanedioic acid, and wherein the trimethylsilyl branched diol has a molecular formula of:

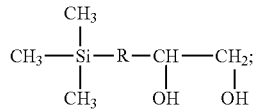

wherein R stands for —CH$_2$—, —CH(CH$_3$)— or —C((CH$_3$)$_2$)—;
   wherein the doped Sb$_2$O$_3$ powder is obtained through a process of evenly mixing an M$^{x+}$solution and an Sb$^{3+}$ solution at first, then dripping in a precipitant until a pH value of 9-10, and finally calcining a precipitate; wherein M$^{x+}$ is more than one ion selected from Mg$^{2+}$, Ca$^{2+}$, Ba$^{2+}$ and Zn$^{2+}$.

2. The preparing method of claim 1, wherein the trimethylsilyl branched diol is synthesized by the steps of:
   (1) mixing raw material alkene, peracetic acid and dichloromethane in a molar ratio of 1:5-10:10-15 and carrying out a first reaction by stirring at 35-40° C. for 5-8 hours, after the first reaction, removing a solvent, and purifying and refining a product to obtain trimethylsilyl propylene epoxide;
   (2) mixing water, concentrated sulfuric acid and the trimethylsilyl propylene epoxide to obtain a first mixture, then heating the first mixture to 80-85° C. in water bath under a stirring condition and holding a temperature to carry out a second reaction for 10-15 minutes to obtain a second mixture, after the second reaction, cooling the second mixture to room temperature, and then neutralizing, distilling, separating and purifying to obtain the trimethylsilyl branched diol, wherein the concentrated sulfuric acid has a mass concentration of 70%, and at a beginning of the second reaction, a molar ratio of the trimethylsilyl propylene epoxide to the water is 1:20-40, whereas the concentrated sulfuric acid usage is 0.1-0.15 wt % of the first mixture;

wherein if the R in the molecular formula of the trimethylsilyl branched diol stands for —CH(CH$_3$)— or —C((CH$_3$)$_2$)—, accordingly the raw material alkene is 3-trimethylsilyl-3-methylpropene or 3-trimethylsilyl-3, 3-dimethylpropene, respectively;

wherein the 2-tert-butyl-1,6-hexanedioic acid, the 3-tert-butyl-1,6-hexanedioic acid and the 2,5-di-tert-butyl-1, 6-hexanedioic acid are synthesized by means of:

mixing tungstic acid and hydrogen peroxide to obtain a third mixture and stirring the third mixture at room temperature for 10-15 minutes, then adding in a raw material alcohol to carrying out a third reaction in a reflux state at 80-85° C. for 1-2 hours at first and next at 90-95° C. for 2-3 hours, after the third reaction cooling, crystallizing, washing and refining to obtain the tert-butyl branched dicarboxylic acid, wherein a molar ratio of the tungstic acid, the raw material alcohol and the hydrogen peroxide is 1:30-40:120-150;

wherein the product is the 2-tert-butyl-1,6-hexanedioic acid, the 3-tert-butyl-1,6-hexanedioic acid and the 2,5-di-tert-butyl-1,6-hexanedioic acid, accordingly the raw material alcohol is 2-tert-butylcyclohexyl alcohol, 4-tert-butylcyclohexyl alcohol or 2,4-di-tert-butylcyclohexyl alcohol.

3. The preparing method of claim 2, wherein the M$^{x+}$ solution is an aqueous solution with a concentration of 0.5-1.0 mol % and an anion is NO$_3^-$; wherein the Sb$^{3+}$ solution is a product of dissolving 5-10 mol % of Sb$_2$O$_3$ in oxalic acid;

wherein the precipitant is ammonia water with a concentration of 2 mol/L;

wherein a molar ratio of M$^{x+}$ to Sb$^{3+}$ is 1-3:100 in a blending solution before a coprecipitation;

wherein the calcining is preceded by a washing process and a drying process for the precipitate, and the drying process is carried out at a temperature of 105-110° C. for 2-3 hours; wherein the calcining comprises the steps of a 400° C. heating for 2-3 hours, a 900° C. heating for 1-2 hours, a cooling in air, and a grinding to obtain the doped Sb$_2$O$_3$ powder with an average particle size less than 0.5 micron.

4. The preparing method of claim 3, wherein the modified polyester is manufactured through the following steps:

(1) the esterification, concocting the terephthalic acid, the ethylene glycol, the tert-butyl branched dicarboxylic acid and the trimethylsilyl branched diol into a slurry, then adding in the doped Sb$_2$O$_3$ powder, a matting agent and a stabilizer and carrying out the esterification in a nitrogen atmosphere with a pressure of 0.1 MPa-0.3 MPa at 250-260° C., finally ending the esterification when a water distillation reaching more than 90% of a theoretical value;

(2) the polycondensation, for esterification products, smoothly reducing the pressure to less than 500 Pa (absolute value) within 30-50 minutes and carrying out a third reaction at 250-260° C. for 30-50 min, successively, further reducing the pressure to less than 100 Pa (absolute value) and continuing the third reaction at 270-282° C. for 50-90 minutes.

5. The preparing method of claim 4, wherein a molar ratio of the terephthalic acid, the ethylene glycol, the tert-butyl branched dicarboxylic acid and the trimethylsilyl branched diol is 1:1.2-2.0:0.02-0.03:0.01-0.02, and an addition of the doped Sb$_2$O$_3$ powder, the matting agent and the stabilizer are 0.012-0.015 wt %, 0.20-0.25 wt % and 0.01-0.05 wt % of an amount of the terephthalic acid, respectively.

6. The preparing method of claim 5, wherein the matting agent is titanium dioxide, and the stabilizer is selected from the group consisting of triphenyl phosphate, trimethyl phosphate and trimethyl phosphite.

7. The preparing method claim 1, wherein the solid state polycondensation is performed to further increase a molecular weight of the modified polyester until an intrinsic viscosity of the modified polyester reaches 1.0-1.2 dL/g.

8. The preparing method of claim 1, wherein a spinning process involves technological parameters of 290-320° C. for an extruder temperature, 295-300° C. for a spin head temperature, 140_bar for a spin head pressure, 22° C. for a cross air temperature, 80±5% for a cross air humidity, 0.5-0.7 m/s for a cross air blow speed, and 2600-3600 m/min for a winding speed; and wherein the stretching and the heat setting processes involve technological parameters of 440-650 m/min for a roller 1 speed, 80±5° C. for a roller 1 temperature, 460-680 m/min for a roller 2 speed, 90-100° C. for a roller 2 temperature, 1900-2400 m/min for a roller 3 speed, 125-140° C. for a roller 3 temperature, 2700-3600 m/min for a roller 4 speed, 220-250° C. for a roller 4 temperature, 2500-3600 m/min for a roller 5 speed, and 150-170° C. for a roller 5 temperature.

9. A polyester yarn for an industrial sewing thread prepared by the preparing method of claim 1, comprising a type of a modified polyester filament;

wherein the modified polyester has a molecular chain structure composed of terephthalic acid segments, ethylene glycol segments, tert-butyl branched dicarboxylic acid segments and trimethylsilyl branched diol segments; and wherein the modified polyester is further dispersed with the doped Sb$_2$O$_3$ powder.

10. The polyester yarn of claim 9, wherein the polyester yarn comprises performance indices of a monofilament fineness of 2-3 dtex, a multifilament fineness of 150-300 dtex, a breaking strength ≥8.0 cN/dtex, a deviation rate of a linear density of ±1.5%, a breaking strength CV value of ≤3.0%, an elongation at break of 13.0-16.5%, an elongation at break CV value of ≤8.0%, an elongation at a 4.0 cN/dtex load of 5.5-7.0%, a dry heat shrinkage of 6.8-9.2% under 177° C.×10 min×0.05 cN/dtex, an interlacing degree of (5-8)±2/m, an oil content of 0.6±0.2 wt %, as well as a dye uptake of 88.9-91.2% and a K/S value of 24.07-26.12 when dyed at 130° C.

11. The polyester yarn of claim 9, wherein the trimethylsilyl branched diol is synthesized by the steps of:

(1) mixing raw material alkene, peracetic acid and dichloromethane in a molar ratio of 1:5-10:10-15 and carrying out a first reaction by stirring at 35-40° C. for 5-8 hours, after the first reaction, removing a solvent, and purifying and refining a product to obtain trimethylsilyl propylene epoxide;

(2) mixing water, concentrated sulfuric acid and the trimethylsilyl propylene epoxide to obtain a first mixture, then heating the first mixture to 80-85° C. in water bath under a stirring condition and holding a temperature to carry out a second reaction for 10-15 minutes to obtain a second mixture, after the second reaction, cooling the second mixture to room temperature, and then neutralizing, distilling, separating and purifying to obtain the trimethylsilyl branched diol, wherein the concentrated sulfuric acid has a mass concentration of 70%, and at a beginning of the second reaction, a molar ratio of the trimethylsilyl propylene epoxide to the water is 1:20-40, whereas the concentrated sulfuric acid usage is 0.1-0.15 wt % of the first mixture;

wherein if the R in the molecular formula of the trimethylsilyl branched diol stands for —$CH(CH_3)$— or —$C((CH_3)_2)$—, accordingly the raw material alkene is 3-trimethylsilyl-3-methylpropene or 3-trimethylsilyl-3, 3-dimethylpropene, respectively.

12. The polyester yarn of claim 11, wherein the $M^{x+}$ solution is an aqueous solution with a concentration of 0.5-1.0 mol % and an anion is $NO_3^-$; wherein the $Sb^{3+}$ solution is a product of dissolving 5-10 mol % of $Sb_2O_3$ in oxalic acid;

wherein the precipitant is ammonia water with a concentration of 2 mol/L;

wherein a molar ratio of $M^{x+}$ to $Sb^{3+}$ is 1-3:100 in a blending solution before a coprecipitation;

wherein the calcining is preceded by a washing process and a drying process for the precipitate, and the drying process is carried out at a temperature of 105-110° C. for 2-3 hours; wherein the calcining comprises the steps of a 400° C. heating for 2-3 hours, a 900° C. heating for 1-2 hours, a cooling in air, and a grinding to obtain the doped $Sb_2O_3$ powder with an average particle size less than 0.5 micron.

13. The polyester yarn of claim 12, wherein the modified polyester is manufactured through the following steps:

(1) the esterification, concocting the terephthalic acid, the ethylene glycol, the tert-butyl branched dicarboxylic acid and the trimethylsilyl branched diol into a slurry, then adding in the doped $Sb_2O_3$ powder, a matting agent and a stabilizer and carrying out the esterification in a nitrogen atmosphere with a pressure of 0.1 MPa-0.3 MPa at 250-260° C., finally ending the esterification when a water distillation reaching more than 90% of a theoretical value;

(2) the polycondensation, for esterification products, smoothly reducing the pressure to less than 500 Pa (absolute value) within 30-50 minutes and carrying out a third reaction at 250-260° C. for 30-50 min, successively, further reducing the pressure to less than 100 Pa (absolute value) and continuing the third reaction at 270-282° C. for 50-90 minutes.

14. The polyester yarn of claim 13, wherein a molar ratio of the terephthalic acid, the ethylene glycol, the tert-butyl branched dicarboxylic acid and the trimethylsilyl branched diol is 1:1.2-2.0:0.02-0.03:0.01-0.02, and an addition of the doped $Sb_2O_3$ powder, the matting agent and the stabilizer are 0.012-0.015 wt %, 0.20-0.25 wt % and 0.01-0.05 wt % of an amount of the terephthalic acid, respectively.

15. The polyester yarn of claim 14, wherein the matting agent is titanium dioxide, and the stabilizer is selected from the group consisting of triphenyl phosphate, trimethyl phosphate and trimethyl phosphite.

16. The polyester yarn of claim 9, wherein the solid state polycondensation is performed to further increase a molecular weight of the modified polyester until an intrinsic viscosity of the modified polyester reaches 1.0-1.2 dL/g.

17. The polyester yarn of claim 9, wherein a spinning process involves technological parameters of 290-320° C. for an extruder temperature, 295-300° C. for a spin head temperature, 140 bar for a spin head pressure, 22° C. for a cross air temperature, 80±5% for a cross air humidity, 0.5-0.7 m/s for a cross air blow speed, and 2600-3600 m/min for a winding speed; and wherein the stretching and the heat setting processes involve technological parameters of 440-650 m/min for a roller 1 speed, 80±5° C. for a roller 1 temperature, 460-680 m/min for a roller 2 speed, 90-100° C. for a roller 2 temperature, 1900-2400 m/min for a roller 3 speed, 125-140° C. for a roller 3 temperature, 2700-3600 m/min for a roller 4 speed, 220-250° C. for a roller 4 temperature, 2500-3600 m/min for a roller 5 speed, and 150-170° C. for a roller 5 temperature.

* * * * *